UNITED STATES PATENT OFFICE.

THEODORE F. FURNESS, OF CYNWYD, PENNSYLVANIA, ASSIGNOR, BY MESNE ASSIGNMENTS, TO ACUSHNET PROCESS COMPANY, INC., A CORPORATION OF NEW YORK.

PROCESS OF RECOVERING PLASTIC RUBBER FROM FABRICS.

1,321,200.     Specification of Letters Patent.     Patented Nov. 11, 1919.

No Drawing. Application filed April 20, 1917, Serial No. 163,520. Renewed September 25, 1918. Serial No. 255,704.

*To all whom it may concern:*

Be it known that I, THEODORE F. FURNESS, a citizen of the United States, residing at Cynwyd, in the county of Montgomery and State of Pennsylvania, have invented certain new and useful Improvements in Processes of Recovering Plastic Rubber from Fabrics, of which the following is a specification.

In the manufacture of a great variety of rubber-containing articles, such as automobile tires, hose, rubber belting and the like, the rubber is intimately associated with a layer or layers of fabric. The object of the present invention is to provide a process whereby plastic rubber may be recovered from such fabrics in usable condition, while at the same time the fiber components of the fabric are also recovered in an unweakened state and without having undergone chemical modification. In so far as the separation of the plastic rubber from the fabric material is concerned, my process is essentially mechanical in its nature, the rubber being mechanically stripped from the fabric surfaces and from the surfaces of the threads and fibers resulting from the progressive disintegration of the fabric; although, as below pointed out this stripping operation may be facilitated, in certain cases at least, by the use of appropriate chemical agents. I will describe as an illustrative example of my process the separation and recovery of rubber and fiber from scrap or similar stock in which the rubber is yet in its uncured or unvulcanized state: but as hereinafter explained, the process may be applied to any fabric coated or impregnated with plastic rubber, which term is employed herein to include not only uncured rubber, but also vulcanized rubber to which a suitable degree of plasticity has been restored by appropriate methods, commonly known as devulcanizing methods, as well as the rubber-like gums, including balata, gutta-percha, etc.

In the manufacture of automobile tires for example, the uncured rubber is incorporated with the fabric, and the article is then built up, shaped and trimmed, this latter operation leaving a considerable proportion of waste known to the trade as "friction scrap." My process will first be described by way of example in its application to the treatment of this particular material.

The stock or friction scrap is received in the form of masses of varying size, consisting of strips and fragments of fabric, impregnated and coated with uncured rubber, and cemented thereby into agglomerates which can be torn apart only with difficulty. These agglomerates are first converted into a rough mat or sheet, preferably by passing them the required number of times through a cracking-mill to which a stream of water is fed. This mill may consist for example of a smooth and a corrugated metal roll set in close proximity; or any equivalent device may be used. The result of this treatment is to convert the agglomerates into a more or less continuous mat, with some tearing and partial disintegration of the fabric. This mat may be directly charged, with water, into a beating machine or "beater," which may be of the type commonly employed in the art of paper-making. The construction and operation of such machines are well known and require no description, further than to note that the beater should be heavily constructed, the distance between the beater roll and the bed-plate being susceptible of the usual adjustment.

In the operation of the beater the fragments of fabric with their adherent coating of plastic rubber pass repeatedly between the bars of the beater roll and those of the bed-plate, whereby the rubber is mechanically stripped or scraped from the surfaces of the fabric, portions of the rubber being detached in the form of small balls, rolls or pellets. At the same time, under the intense action of the beater blades, the fabric is progressively "unwoven," that is, reduced to its constituent threads; and in precisely similar manner these threads are stripped of the adhering coating of rubber by the action of the blades. By a continuation of the same action, the threads are to a greater or less extent, according to the duration and intensity of the treatment, resolved into their constituent fibers or fiber bundles, from which likewise the coating of plastic rubber is stripped. This operation, which usually requires from six to ten hours for its completion, is as will be noted, essentially mechanical in character, although as already mentioned, certain chemical agents may be used in connection with the process without departing from my invention.

I have found it to be entirely practicable, by operating in this way, to effect a very thorough cleaning of the fibers from the adhering rubber without any destructive action upon the fiber. This permits me to recover practically the whole of the fiber of the original stock in usable condition.

The plastic rubber is detached in the form of small masses which exhibit a strong tendency to amalgamate with each other, the aggregates so formed tending constantly to increase in size as the process continues. The fact that the rubber forms aggregates is of value in the process, for it not only simplifies the ultimate separation of the rubber from the fabric but also aids in stripping the rubber from those threads which may not come into direct or sufficient contact with the beater blades. This tendency to amalgamation is considerably increased by heating the water, say to 50°–60° C., or higher, since the plasticity of the rubber is greater at these higher temperatures. In the particular operation described above the stripping of the rubber from the surfaces of the fabric, as well as from the threads and fibers, is accomplished in presence of water and beneath the surface thereof. Water lessens to a marked extent the adhesion between the rubber and the fabric or fiber; also, when used in large volume, it serves to wash the fiber from the rubber and thus to keep the two apart after stripping has been accomplished.

Although I have found that when treating uncured friction, water, preferably at a temperature above normal, is entirely satisfactory as a vehicle in which to carry out the stripping operation, it is nevertheless within my invention to use various modifying agents which may have for their effect either to lessen the adherence between the rubber and fiber, or to increase the plasticity of the rubber or the amalgamating tendency of the detached rubber particles, or which may in any other way facilitate the described operation. Among such modifying agents I may mention caustic soda and sodium carbonate, used in small proportions and at a dilution which will not injure the fiber; soaps; and various oils or hydrocarbon bodies or derivatives, such as kerosene, turpentine, gasolene, benzol, phenol, etc., especially such as have some swelling action upon the rubber. But even when these or other chemical substances are used as auxiliaries to facilitate the operation, the process retains its distinctively mechanical character, and consists essentially in progressively disintegrating the fabric in presence of water (including aqueous solutions, emulsions or suspensions), while at the same time stripping the plastic rubber from the fabric and from the threads and fibers resulting from the disintegration of the fabric. It is my discovery that a mechanical operation of this character, if sufficiently intense and prolonged, will accomplish a commercially complete separation between the rubber and the residual fiber, without injury to the latter.

The efficiency and speed of this stripping action may be somewhat improved by adjusting the distance between the blades of the beater roll and those of the bed-plate as the operation proceeds. The actual adjustment will depend of course upon the quantity and character of the charge; but it has been found satisfactory when treating the usual run of friction to start with an aperture of about five-sixteenths inch, which is gradually reduced to about one-sixteenth inch by successive adjustments over a period of several hours. After the fabric has been practically reduced to fiber and fiber bundles, and these have been practically stripped of rubber, the beater blades may if desired be slightly raised to increase the aperture, thereby allowing the small masses of plastic rubber a better opportunity to amalgamate into the form of larger aggregates.

At the conclusion of this operation the water in the beater carries in suspension the threads and fiber aggregates from the disintegrated fabric; and also, when the specific gravity of the rubber is sufficiently low, irregularly shaped floating masses of rubber substantially free from fiber, or carrying only a relatively small quantity of mechanically entangled fiber. These masses may vary in size from mere pellets to large irregular lumps or aggregates several inches in diameter. The separation of the rubber from the fiber might be completed by a laborious and expensive process of handpicking. I have found, however, that it is possible, in a subsequent operation, to continue and accelerate the amalgamating action which has already begun in the beater, whereby the rubber is largely collected into comparatively large bodies, and the separation is very greatly simplified.

I accomplish this by strongly agitating the mixed mass of rubber and fiber in presence of water, preferably at a temperature substantially above normal. For example, the entire charge from the beater may be directly transferred to a large rotary drum, preferably provided with inwardly projecting longitudinal ribs or equivalent means for tumbling and agitating the contents. The effect of this tumbling operation, which may require from one to three hours, is to cause the scattered particles of rubber to collect and amalgamate into relatively large masses, often weighing several pounds. If the charge is introduced hot from the beater, the application of further heat in the drum is not essential to success, although heat may be so applied.

It is noteworthy that both in the beating and tumbling operations, the plastic rubber tends to the formation of aggregates from which fiber is, for all practical purposes, excluded. At the conclusion of the tumbling operation, the charge may be dumped upon coarse strainers, and the rubber masses separated from the fiber by hand. The fiber is freed from excess water by wringers or otherwise, is dried, and may be finished in any suitable way, for example, on a cotton-picking machine or similar device. A Garnett machine has been found satisfactory for the purpose. The rubber aggregates may if desired be further prepared for marketing by passing them repeatedly through wet rolls or equivalent sheeting devices, such as are ordinarily used in the rubber industry, or through an ordinary corrugated wash mill.

The process has been thus far described in its application to scrap or friction in which the rubber is in the uncured or non-vulcanized and highly plastic condition. A more or less plastic condition of the rubber is indeed essential to its satisfactory separation from the fabric; but this plasticity may be secured by subjecting cured or vulcanized rubber, or old rubber, to any suitable devulcanizing treatment, whereby its plasticity is to a sufficient degree restored. For example, vulcanized rubber may first be digested with a weak caustic soda solution, say a two per cent. solution, for a sufficient time to remove the free sulfur which would otherwise during the ensuing step oxidize in part to sulfuric acid by which the fabric would be weakened or destroyed. The material is then thoroughly washed and thereafter digested with water under a high temperature and pressure, for example a temperature of about 150° C. for eight to ten hours, or until the rubber is rendered plastic. This treatment has been found sufficient to plasticize certain grades of rubber, without injury to the fabric. Higher temperatures might of course be used, but there is then some danger of weakening the fabric. Or, instead of the above procedure, any other suitable method may be used whereby the plasticity of the rubber is restored in sufficient measure to render it amenable to treatment by the separating process before described. It is more particularly in conjunction with rubber to which plasticity has been restored by the above or other means, that the use of chemical modifying agents as auxiliary to the mechanical or stripping process has been found desirable.

It is to be understood that the specific examples above given are illustrative only, for it is obvious that the process may be carried out in other types of apparatus without departing from the spirit of my invention. Furthermore, my invention is not restricted to the particular manipulations described above as constituting its preferred embodiment, since these may be variously modified. For example, the disintegration or shredding of the fabric might be carried out in an operation preliminary to and more or less distinct from the stripping of the rubber from the threads and fibers resulting from such disintegration or shredding.

Also, the process can be carried out, although with less satisfactory results, on an ordinary rubber mill having corrugated or grooved metal rolls and provided with means for washing the rubber while it is being rolled. In the use of such a mill the stock, as for example the uncured friction above mentioned, is repeatedly carried through the mill while flooded with water. The first effect is to sheet the mass as described above. When the treatment in the mill is first started the mass is cohesive, and a continuous sheet or cylinder of rubber can be formed which will fit loosely around one of the rolls; but as the treatment is continued the sheet appears to lose its cohesiveness and tends to crumble. The process must be continued beyond this point, and after a more or less prolonged treatment the components of the fabric will begin to separate from the rubber and will be washed from the surface of the sheet. As the fabric is removed, the rubber mass appears once more to regain its cohesiveness, and eventually a sheet of rubber reasonably free from fiber may be produced The fiber which has been washed out may be recovered by draining off the water and treating further as above described. Although a reasonable separation may be effected in a mill of this type in a relatively short time, nevertheless the fiber obtained is very much broken into short lengths, and only a relatively small amount of material can be treated at a time. I prefer therefore to carry out the process by the employment of the beater washer as described above.

I claim:—

1. The process of recovering plastic rubber and fiber from rubber-coated fabric, which consists in progressively disintegrating the fabric in presence of water and simultaneously stripping the plastic rubber from the fabric and from the threads and fibers resulting from its disintegration.

2. The process of recovering plastic rubber and fiber from rubber-coated fabric, which consists in progressively disintegrating the fabric in presence of water and simultaneously stripping the plastic rubber from the fabric and from the threads and fibers resulting from its disintegration, and thereafter subjecting the commingled rubber and fibrous material to agitation in presence of water until the rubber is largely amalgamated into easily separable aggregates or masses.

3. The process of recovering plastic rubber and fiber from rubber-coated fabric, which consists in subjecting the stock to a suitable treatment to increase the plasticity of the rubber without destroying the fibrous material, progressively disintegrating the fabric in presence of water and simultaneously stripping the plastic rubber from the fabric and from the threads and fibers resulting from its disintegration.

4. The process of recovering plastic rubber and fiber from rubber-coated fabric, which consists in subjecting the stock to a suitable treatment to increase the plasticity of the rubber without destroying the fibrous material, progressively disintegrating the fabric in presence of water and simultaneously stripping the plastic rubber from the fabric and from the threads and fibers resulting from its disintegration, and thereafter subjecting the commingled rubber and fibrous material to agitation in presence of water until the rubber is largely amalgamated into easily separable aggregates or masses.

5. The process of recovering plastic rubber and fiber from rubber-coated fabric, which comprises wetting the material, progressively disintegrating the fabric and simultaneously stripping the plastic rubber from the fabric and from the threads and fibers resulting from its disintegration.

In testimony whereof I affix my signature in presence of two witnesses.

THEODORE F. FURNESS.

Witnesses:
CHAS. I. CRONIN,
E. K. MOUNINGTON.